United States Patent
Johannessen et al.

(10) Patent No.: US 11,708,308 B2
(45) Date of Patent: Jul. 25, 2023

(54) SINTERABLE POWDER FOR MAKING A DENSE SLIP CASTED PRESSURELESS SINTERED SIC BASED CERAMIC PRODUCT

(71) Applicant: FIVEN NORGE AS, Lillesand (NO)

(72) Inventors: Vidar Johannessen, Kristiansand S (NO); Costana Mihaela Bousquet, Cavaillon (FR)

(73) Assignee: FIVEN NORGE AS, Lillesand (NO)

( * ) Notice: Subject to any disclaimer, the term of this patent is extended or adjusted under 35 U.S.C. 154(b) by 220 days.

(21) Appl. No.: 16/955,992

(22) PCT Filed: Dec. 21, 2018

(86) PCT No.: PCT/NO2018/050322
§ 371 (c)(1),
(2) Date: Jun. 19, 2020

(87) PCT Pub. No.: WO2019/132667
PCT Pub. Date: Jul. 4, 2019

(65) Prior Publication Data
US 2021/0087117 A1    Mar. 25, 2021

(30) Foreign Application Priority Data
Dec. 28, 2017 (NO) .................................. 20172052

(51) Int. Cl.
*C04B 35/565* (2006.01)
*C04B 35/626* (2006.01)
*C04B 35/634* (2006.01)

(52) U.S. Cl.
CPC ........ *C04B 35/565* (2013.01); *C04B 35/6261* (2013.01); *C04B 35/62625* (2013.01); *C04B 35/62655* (2013.01); *C04B 35/63476* (2013.01); *C04B 2235/3821* (2013.01); *C04B 2235/424* (2013.01); *C04B 2235/425* (2013.01); *C04B 2235/48* (2013.01); *C04B 2235/5436* (2013.01); *C04B 2235/5445* (2013.01); *C04B 2235/6027* (2013.01); *C04B 2235/668* (2013.01)

(58) Field of Classification Search
CPC .............. C04B 35/565; C04B 35/6261; C04B 35/62625; C04B 35/62655; C04B 35/63476; C04B 2235/3821; C04B 2235/424; C04B 2235/425; C04B 2235/48; C04B 2235/5436; C04B 2235/5445; C04B 2235/6027; C04B 2235/668; C04B 2235/3826
See application file for complete search history.

(56) References Cited

U.S. PATENT DOCUMENTS

| | | | |
|---|---|---|---|
| 4,004,934 A * | 1/1977 | Prochazka | C04B 35/64 264/659 |
| 4,195,066 A * | 3/1980 | Schwetz | C04B 35/563 501/87 |
| 4,524,138 A * | 6/1985 | Schwetz | C04B 35/563 501/91 |
| 4,756,482 A | 7/1988 | Matje et al. | |
| 9,376,348 B2 * | 6/2016 | Johannessen | C04B 35/62655 |
| 2006/0019816 A1 | 1/2006 | Lynen et al. | |
| 2011/0175264 A1 * | 7/2011 | Pujari | B82Y 30/00 977/773 |
| 2014/0327163 A1 | 11/2014 | Johannessen | |

FOREIGN PATENT DOCUMENTS

DE    4124734 A1    1/1993
JP    63-248771 A    10/1988

OTHER PUBLICATIONS

International Search Report dated Apr. 1, 2019 issued in corresponding International Application No. PCT/NO2018/050322.
International Preliminary Report on Patentability dated Feb. 10, 2020 issued in corresponding International Application No. PCT/NO2018/050322.
Search Report dated Sep. 4, 2018 issued in corresponding Norwegian Patent Application No. 20172052.

* cited by examiner

*Primary Examiner* — Noah S Wiese
(74) *Attorney, Agent, or Firm* — Pillsbury Winthrop Shaw Pittman, LLP

(57) ABSTRACT

A SiC based sinterable powder mixture comprising, by dried weight of said powder: a) a mineral content comprising—silicon carbide (SiC) particles, —mineral boron compound particles, the powder comprising at least 50% by weight of SiC and the total mineral content of the powder being at least 90% by weight, b) at least a water insoluble carbon-containing source, in particular a carbon containing resin, the powder comprising at least 1% by weight, and preferably less than 10% by weight, of said water insoluble carbon-containing source, wherein the average particle size of said sinterable powder is comprised between 0.5 to 2.0 micrometers.

20 Claims, No Drawings

SINTERABLE POWDER FOR MAKING A DENSE SLIP CASTED PRESSURELESS SINTERED SIC BASED CERAMIC PRODUCT

CROSS-REFERENCE TO RELATED APPLICATIONS

This Application is the U.S. National Stage of PCT/NO2018/050322, filed Dec. 21, 2018, which claims priority to Norwegian Patent Application No. 20172052, filed Dec. 28, 2017, the contents of each of which are incorporated herein by reference in entirety.

The present invention relates to the field of dense materials based on silicon carbide (SiC), in particular the materials made by a pressureless sintering method starting from a body shaped by casting a slip with water solvent.

More particularly, the invention relates to a sinterable powder which can be directly used for slip casting without the need for a preliminary (cold) pressing. The instant invention is also directed to a method for the manufacturing of a dense and homogeneous SiC-based sintered body starting from such powder.

Such a SiC ceramic body or element can notably be used in the field of advanced ceramics, monolithic or composites, as for example components of furnaces, of engine or turbines, kiln furniture, igniters, bricks, blocks tubes or plates, crucibles, wear resistant and/or corrosion resistant components in particular for chemical or metallurgical applications, in particular complex shapes.

Ceramics or refractory materials made from silicon carbide obtained by sintering at high temperature are increasingly used in applications where their high chemical inertia and their high refractoriness allow them to withstand high mechanical stresses or thermo-mechanical stresses.

It is known that the properties of sintered bodies depend to a great extent on the nature of the starting powders used for the manufacture of the sintered bodies by known powder metallurgy processes. For example, for the pressureless sintering of a mixture of silicon carbide and boron carbide or carbon and boron, it is widely thought that the initial mixture of some very fine starting powders is necessarily required, generally whose gain size is submicronic. The powders must meet certain requirements not only with regard to particle size and particle size distribution but also with regard to content of impurities. Such powders must be sinterable to a required degree and substantially free of foreign substances which may interfere with the sintering process or lead to undesirable foreign substances in the finished sintered body.

One of the most important criteria with regards to the expected properties and the capability to withstand high mechanical stresses or thermo-mechanical stresses is the density of the final product after the sintering thermal treatment. More precisely, the highest density is sought.

The silicon carbide powders used in the instant method are generally produced by the Acheson process. This process is widely used to prepare sinterable silicon carbide, for economic reasons and because of its readier availability. Silicon carbide produced by the Acheson process, because of the high manufacturing temperatures required in the process, consists mainly of the thermodynamically more stable alpha modification.

Silicon carbide powders can therefore be obtained in the required fineness by intensive grinding of compact grains obtained from industrial SiC production.

Several methods were previously described to manufacture dense carbide-based bodies by pressureless sintering process:

U.S. Pat. No. 4,524,138 discloses a process wherein an homogeneous pulverulent mixture of SiC and B4C and a carbon source which is coked before shaping and pressureless sintering. The carbon source may be a phenol-formaldehyde resin, for example a Novolak resin, dissolved in an organic solvent such as acetone or aliphatic alcohols having from 1 to 6 carbon atoms.

With such a proceeding hard agglomerates are formed and must be broken by an additional dry milling step, which is a source of contamination and cost. Moreover, the manufacturing process disclosed in this patent is directed to the shaping of semi dried mixture for pressing, with large amounts of organic additives useful for the extrusion or injection molding. Slip casting from such a mix with organic solvent is particularly difficult to be implemented and leads to environment issues.

U.S. Pat. No. 4,756,482 discloses for example a process for the manufacture of Silicon carbide and/or Boron carbide sinterable powders used to produce sintered bodies. The sinterable powders are obtained by wet grinding of the SiC and Boron Carbide starting powders together with antioxidants and surfactants. As taught by this document, these additives are added during grinding and must importantly be completely solved in the aqueous suspension. Resulting from the addition of such antioxidants and surfactants, the contamination is reduced. Such a powder could be used for slip casting before firing but the pressureless sintered SiC body exhibits a low density even at high firing temperature.

More recently, US 2006/0019816 (also called herein "US-816") disclosed a process for manufacturing a SiC composite body, wherein a slurry is prepared by mixing simultaneously SiC feed stock, a carbon precursor and composite granules containing non graphitic carbon with a carbon yielding binder. The additional use of sub-micrometer boron carbide particles is mentioned as an additional sintering aid for the pressureless self-sintering process, in a concentration from 0.5 to 2.0% by weight. Co-milling is preferred only for preparing SiC and sintering aid like B4C and, as shown by the examples, the aqueous slurry is only stirred probably to avoid the destruction of the granules or carbonaceous composite. The carbonaceous precursor may be starches, lignosulfonates or phenol formaldehyde resins to be uniformly distributed over the surface of the silicon carbide particles. According to the authors, it is necessary that the carbon source dissolves in the solvent to coat the SiC particles.

Phenol formaldehyde resins which are soluble in water, like Resolic phenolic resins impact the rheology of the slip for casting so much that required solids loading higher than 65% cannot be reached. Thus complex shapes cannot be obtained with high sintering density, i.e. higher than 95% of theoretical density (3.21 in case of a SiC sintered product). In order to reach the desired density of the final piece, the initial mixture of submicronic SiC, B4C and solubilized additives and solvent is spray dried and the dried mixture further is isostatically molded at a 2000 bars pressure.

The previous shows that there is no manufacturing method or initial powder that enables the obtaining of a pressureless sintered product shaped by slip casting without initial molding under high pressure, and which finally leads to a very high density of said product, that is higher than 95% of the theoretical density.

There exists therefore a need for a method which leads to the manufacture of bodies with a complex shape or large dimensions and formed by a dense material obtained by slip casting in a water solvent, followed by a pressureless sintering from aqueous slurry of a mixture of SiC grains and Boron compounds grains, which exhibits yet after pressureless sintering of the molded piece a high level of density, i.e. higher than 95% of the theoretical density.

It has been discovered through the experiments carried out by the applicant that pieces of pressureless SiC-based sintered body with high density can be obtained by aqueous slip casting from a sinterable powder which comprises co-milled SiC powder with a boron compound and a carbon containing source, in particular carbon containing resin, provided that said powder is maintained in a very specific grain size range.

More particularly the present invention is detailed in the attached claims, the content of which is reported in the present description.

Despite the teaching of the prior art, the experiments made by the applicant showed more particularly that it is possible to make such a dense product, starting from a specific SiC based powder. Such SiC based powder can be obtained by using a process which comprises the following steps:

co-milling an aqueous mixture of a mineral powders of SiC and mineral compound of boron, preferably $B_4C$, before, during or after the previous step, adding a carbon containing source, in particular carbon containing resin grains which are not soluble in water so that the average particle size of the resulting mixture is comprised between 0.5 to 2.0 micrometers, preferably between 0.7 to 1.5 micrometers.

optionally dry the resulting mixture so that to obtain a sinterable powder having less than 1% moisture.

Pressureless SiC Based Sinterable Powder of the Invention:

The present invention is also relating to a SiC-based sinterable powder (or powder mixture) which can be obtained by the previous mentioned process.

More particularly, said SiC based sinterable powder can comprise, by dried weight of said powder:

a) a mineral content comprising
silicon carbide (SiC) particles,
mineral boron compound particles,
the powder comprising at least 50% by weight of SiC and the total mineral content of the powder being at least 90% by weight, b) at least a water insoluble carbon-containing source, in particular carbon containing resin grains, the powder comprising at least 1% by weight, and preferably less than 10% by weight, of said water insoluble carbon-containing source, wherein the average particle size of said sinterable powder is comprised between 0.5 to 2.0 micrometers.

For example, said SiC based sinterable powder can comprise, by dried weight of said powder the following mixture:

at least 50% by weight of SiC, said SiC being mixed and preferably co-milled with a mineral compound of boron, preferably $B_4C$, the total mineral content in said powder being at least 90%, preferably at least 92%, even more preferably less 99% and more preferably less than 98%, at least 1%, preferably at least 2%, preferably at least 4%, and preferably less than 10%, preferably less than 8%, preferably less than 6% by weight of a water immiscible carbon-containing source, in particular carbon containing resin grains, preferably phenol resin grains, more preferably formaldehyde resin grains, wherein the overall average particle size of said powder is comprised between 0.5 and 2.0 micrometers, preferably between 0.7 and 1.5 micrometers most preferably between 0.8 and 1.2 micrometers.

Importantly, the powder mixture of the invention is not a powder of solid "agglomerates" or of "granules" but a powder wherein the grains of SiC, of the mineral boron-containing compound or of the carbon containing source, in particular carbon containing resin, are not bonded together. Even if some of the grains may be in contact due low electrostatic forces, all the grains may be easily individualized but the powder remains homogeneous so that it will not segregate during the use for slip casting.

Such powder is characterized by the selected size of its constituting grains and the presence of a carbon containing source, in particular carbon containing resin, which is not soluble in water.

In the current application, except otherwise specifically mentioned, all the percentages are weight percentages.

The following definitions are given according to the instant invention:

By pressureless sintering, it is meant a sintering operated at a temperature above 1600° C., preferably above 1800° C., without additional pressure, said sintering occurring in solid state, without the melt of the mineral part (i.e at least SiC and Boron compound) of the mixture.

By total mineral content of sinterable powder, it is understood the content of all the components of said powder which are not under organic form. By organic form it is meant a component comprising as main constituents C and H atoms.

Water insoluble carbon source according to the invention includes water insoluble resin, amorphous carbon, in particular carbon black, or crystallized carbon as graphitized carbon or graphite oxide.

By water insoluble resin it is meant that the resin grains essentially remains in solid state in the aqueous solvent and don't, or substantially don't, dissolve in water. Preferably, the water solubility of such a carbon containing resin is lower than 0.1% by weight, preferably is lower than 0.01% by weight of the resin dissolved per liter of water at 20° C. and 1 bar pressure.

By SiC based ceramic product, it is meant a product comprising at least 50% by weight of SiC, preferably at least 60% by weight of SiC, more preferably at least 70% by weight of SiC, or even more preferably at least 80% by weight of SiC or at least 90% by weight of SiC.

A powder is constituted of grains or particles as individual solid substances. Conventionally, the "average particle size or diameter" also called "$D_{50}$" of a powder is the size in microns or micrometers for which, 50% by volume of the grains or particles have a size of $D_{50}$ or more and 50% by volume of the grains have a size of strictly less than $D_{50}$. Such $D_{50}$ is conventionally obtained from the cumulative granulometric distribution curve of the grain sizes of the powder which is measured typically by a laser diffraction scattering method providing:

Up the ordinate, percentages such that a percentage of p % represents the fraction of the powder having p %, by volume, of larger sized grains; and Along the abscissa, the grain sizes Dp, Dp being the smallest possible grain size in the powder fraction represented by the percentage p % along the abscissa.

The percentile $D_0$ corresponds to the maximal particle size. The percentile $D_{10}$ of a powder is the size in microns for which, 10% by volume of the grains or particles have a size of $D_{10}$ or more and 90% by volume of the grains have a size of strictly less than $D_{10}$. The percentile $D_{90}$ of a powder is the size in microns for which, 90% by volume of the grains or particles have a size of $D_{90}$ or more and 10% by volume of the grains have a size of strictly less than $D_{90}$. It is thus possible to calculate the ratio (D90−D10)/D50." The equipment used to measure the particle sizes is a mastersizer 2000 delivered by Malvern. The refractive index was set at 2.6.

Apparent or bulk density is measured according to ISO18754. Relative density is calculated by dividing the apparent density by the theoretical density depending of the material components. For example pure SiC theoretical density is 3.21.

According to preferred embodiments, which could be combined between them:

The carbon containing source can be amorphous or crystallized. It has the advantage to undergo few hazardous gases emissions during firing. The carbon source can preferably be carbon black because of high reactivity during sintering of the ceramic body.

The carbon containing resin in the powder according to the present invention is preferably selected among the resins which melt at a temperature higher than 80° C., preferably at a temperature higher than 90° C., or even higher than 100° C. A particular advantage of this low melting temperature characteristic is that slip casted bodies may be grinded and/or machined with better yield or lower losses.

The resin according to the present invention exhibits preferably a carbon content which is higher than 30%, preferably higher than 40% by weight, in order to reduce the porosity of the sintered body.

More preferably the carbon containing resin is a water insoluble phenol-formaldehyde resin, for example as those sold by Novolak.

Bakelite® type of resin, in particular the grade PF0235 DP which melts at a temperature of about 105° Celsius is also well adapted for the sinterable powder of the present invention when the carbon powder is added to SiC and Boron mineral compound before or during co-milling. The grade Bakelite® PF 7219 DW 02 is more suitable in the case when the carbon containing powder is added after co-milling SiC and Boron mineral compound.

Other suitable carbon sources may be used in addition to the carbon containing resin, such as carbon-containing organic compounds and or elemental carbon source like carbon black or graphite, preferably carbon black or graphite. Suitable carbon source like graphite may be used in addition to carbon black when no resin is used.

The content of free carbon (in the present case for example not bonded with Si or Boron like SiC or B4C) of the sinterable powder may be measured by LECO according to ANSI B74.15-1992-(R2007). The free carbon is preferably in the range of 1% to 10% of powder based upon the silicon carbide content of the sinterable powder.

According to other preferred features of the resulting power:

The ratio (D90−D10)/D50 is preferably less than 2.0, preferably less than 1.8 and more preferably less than 1.7.

The maximal particle grain size $D_0$ is 7 micrometers, preferably 5 µm, and most preferably 4 µm.

The present invention relates also to a slurry comprising and preferably consisting essentially or totally of the SiC-based sinterable powder mixture described previously and water. Preferably, the solid loading in the slurry is higher than 65%, preferably 70%, even more than 75%, the rest being water.

Processing of the Powder of the Present Invention:

The present invention is also relating to a manufacturing method of a pressureless sinterable SiC based powder as described above, comprising the following steps:

co-milling an aqueous mixture of a powder of SiC and a powder of a mineral compound of boron, preferably $B_4C$, before, during or after the previous step, adding a carbon containing source, such as amorphous carbon or resin grains which are not soluble in water so that the average particle size of the resulting mixture is comprised between 0.5 to 2.0 micrometers, preferably between 0.7 to 1.5 micrometers.

optionally dry the resulting mixture so that to obtain a co-milled or sinterable powder having less than 1% moisture by weight.

The carbon containing source, in particular the carbon containing resin powder, is preferably added during the co-milling of the mineral part of the mixture. Such proceedings avoid any possibility of agglomerates. Advantageously, the initial (i.e. before co-milling) $D_{50}$ value of the particles size distribution of the carbon containing source, in particular the carbon containing resin, is comprised between 10 and 30 microns.

Advantageously, the initial $D_{50}$ value of the particles of the first SiC powder and the second boron compound powder (preferably a non-oxide Boron compound, more preferably $B_4C$, but not limited thereto) are respectively comprised between 2 and 15 microns, preferably 3 to 10 microns, but according to the invention it is also possible to use coarser particles.

Preferably, after co-milling, the content of the mixture SiC and mineral Boron compound, preferably $B_4C$, is higher than 80% of dried weight the sinterable powder, more preferably higher than 85%, preferably higher than 90%, or not less than 95%.

According to the invention, the co-milling of SiC and mineral boron compound particles (preferably $B_4C$, but not limited thereto), preferably with the carbon containing resin, is operated in a conventional attrition mill, although any other known technique may also be used. Very importantly, the co-milling is continued until the $D_{50}$ value of the resulting powder (preferably including the particles of carbon containing resin) is between 0.5 and 2.0 micrometers and more particularly between 0.7 and 1.5 micrometers and most preferably is between 0.8 to 1.2 micrometers.

It has been discovered that the compliance with this specific range of particle size of the sinterable powder is essential to achieve the expected properties of the final sintered product and more precisely to reach the sought highest density of said product.

If the average size of the particles of the sinterable is out of the preceding range (i.e. higher or lower), it has been discovered that the properties of the final product are significantly lower as shown by the examples below. More particularly and contrarily to the previous knowledge, it has been discovered that it is not necessary that the particle size of the powder mixture be as fine as possible. Rather the particle size of the powder mixture must remain in the specific range mentioned above to get the final highest density.

Importantly and in addition, as another essential aspect of the current invention, it has been discovered also that the carbon-containing additive used in the process as a sintering aid during the firing must be insoluble in water. Again, this feature goes clearly against the general usual behavior as disclosed in the previous cited prior art, wherein it is taught that the carbon-containing additive must be chosen as soluble in the solvent used for the slip casting.

During co-milling step such components, known by the man skilled in the art, like wetting agent, non-ionic surfactant, low foaming, lubricants, or event dispersants, may be added to the mixture.

A chemical treatment of SiC and/or $B_4C$ compound implemented preferably before co-milling and more importantly before the addition of carbon containing source, in particular the carbon containing resin, is implemented so as to remove impurity contents such as metallic silicon, silica, iron and aluminum and so that the total amount of impurities is less than 2% by weight, based upon the silicon carbide content. By impurities it is meant the low remaining amounts of Silicon metal (Si), silica ($SiO_2$), iron (Fe) and Aluminum (Al) which is located mainly on the grains surface. Such a chemical treatment implies the use of a Brönsted acid such as the sulfuric acid $H_2SO_4$ after the treatment with a basic solution.

In case of treatment of SiC and/or $B_4C$ powder before co-milling, the treated powders are transported by a filter belt under vacuum with a water flush to clean the grains after treatment.

In case of treatment after co-milling, water slurry of the mixed SiC and B4C powder is first heated to a temperature proximate to 80° C., then a basic compound such as NaOH is first added and thereafter the acid compound is used to decrease the pH. In case of a carbon source being amorphous carbon or crystallized carbon, basic treatment is preferably done with ammonia until a PH of at least 8.5.

The conditions are matched so that the total amount of impurities (comprising Silicon metal (Si); P silica ($SiO_2$); iron metal (Fe) and surface Aluminum metal (Al)) is less than 2% by weight and more preferably less than 1% by weight, based upon the silicon carbide content.

An acrylic polymer suspension may be added to this sinterable powder up to 10% by weight, preferably less than 8% by weight of co-milled powder. The preferred suspension exhibits a solid content of 30 to 60% and a viscosity less than 1500 mPa·s measured by a Brookfield LV viscosimeter with spindle of 3.60 rpm. Such a polymer suspension helps to increase significantly the green body strength after shaping and before drying and firing.

Manufacturing Process of the Pressureless Sintered Body:

The instant invention is also related to a manufacturing method of a SiC pressureless sintered body comprising the following steps:
- preparation of an aqueous slurry comprising the previously described pressureless sinterable powder, solid loading being at least 65%, preferably at least 70%, even more preferably at least 75% by weight, the rest being water, preferably de-ionised water and temporary binder and/or dispersant.
- slip casting to obtain a shaped body
- drying of the shaped body
- optionally curing step under air at a temperature higher than 100° C. and below 300° C.
- pressureless heat treatment of the above body, under a sintering temperature of between 2000 and 2400° C., preferably between 2000 and 2200° C.

The viscosity of the slip is preferably comprised between 0.1 to 0.5 Pa·s, more preferably between 0.2 to 0.3 Pa·s measured at constant rate of 40 $s^{-1}$. Viscosity measurements were performed on a Bohlin Instruments viscometer using a couette (also known as cup and bob) system with a DIN coaxial cylinder.

In case the carbon source is amorphous (i.e. carbon black) or crystallized carbon, a dispersant system comprising low molecular weight polymers, typically not more than 1000, preferably less than 5000, or even less than 200, with low sodium content is used. A dispersant system based on electrostatic effect is used to avoid agglomeration of the mineral powders within the slip, for example a dispersant consisting of 2-amino-2 methyl propanol alone or preferably in combination with low Na methyl-metacrylate to reduce diffusion of fine carbon particles into the mould during casting.

The mould may be of plaster and the mould internal part in contact with the slip may be covered with a primer including for example silicone, talc and/or some other lubricant components to avoid sticking.

During curing step, at a temperature higher than the melting temperature of the carbon containing resin helps grinding or machining at a green stage ie before firing.

The pressureless heat treatment may comprise a step of carbonizing the organic part, preferably performed under no-oxidizing atmosphere, by preference under argon and at a temperature preferably lower than 1000° C., in such a manner as to ensure a sufficient mechanical strength prior to the sintering process and to avoid an uncontrolled oxidation of the SiC.

The heat treatment comprises or is followed by a step of sintering which is carried out under no additional pressure at high temperature, in other words at a temperature higher than 2000° C. but lower than 2400° C. to avoid the decomposition of SiC, preferably between 2000° C. and 2200° C. Preferably, said heat treatment is conducted under a non-oxidizing atmosphere, for example of Argon.

The advantages previously described are illustrated by the non-limiting examples that follow, illustrating certain embodiments of the invention. The following examples allow a comparison to be made with the products obtained according to the prior art and comparative processes.

EXAMPLE 1

According to the Invention

A raw batch of a mixture of 94% by weight of a silicon carbide powder having a $D_{50}$ of 10 microns, 1% by weight of a boron carbide powder having a $D_{50}$ of 3 microns, and 5% by weight of water-insoluble Novolak resin grains having an average particle size of 20 micrometers is milled in a conventional attrition mill in a water-based slurry. The average diameter $D_{50}$ of both starting powders is about 4 micrometers. The co-milling process is continued three days, so that the average particle size D50 of the particles mixture, as measured by the mastersizer 2000 laser diffraction particle size analyzer, is decreased to about 1 micrometer, with a D10 of about 2 micrometer and a D90 of about 0.5 micrometer.

A dried powder with a moisture content of less than 1% by weight is obtained from the resulting composition by spray drying using an atomizer apparatus.

5% of an acrylic emulsion is added to the dried powder and water to achieve a solid content of 75 percent solids relative to the dry matter. Such slurry is rolled during 24 h to homogenize the powder mixture. Rubber coated steel balls are used as mixing aid. The slip is adjusted to a pH of 8-8.5 by adding a Sodium Hydroxide solution before casting. The viscosity of the obtained slurry is about 200 mPa·s (at 40 s$^{-1}$ and at 20° C.)

Three Burner nozzles were shaped having a tronconical shape with the following dimensions: bottom large internal diameter 10 cm, top small internal diameter 4 cm, bottom large external diameter 11 cm, top small external diameter 4 cm, total height 30 cm. The pieces are shaped by casting the slip in plaster moulds. The pieces after air drying during 12 hours are demolded, placed in an oven at 110° C. The green density is 2.0 g/cm3. The pieces are then fired at 2110° C. under Argon during 4 hours.

The apparent density of the pieces was measured according to ISO 5017 standard. Theoretical density is calculated from the composition of the sintered body. In this case theoretical density is 3.21. Relative density is the ratio of the apparent density vs the theoretical density. Results are gathered in the tables 1 and 2 below.

EXAMPLE 2

According to the Invention

The same proceeding as example 1 according to the invention was followed but the water insoluble resin was added after co-milling and with an average grain size of about 1.3 micrometers.

EXAMPLE 3

According to the Invention

The same proceeding as example 1 of the invention was followed but 40% by weight of the carbon containing resin was replaced by the carbon black.

EXAMPLE 4

According to the Invention

The same proceeding as comparative example 5 but with the following changes:
- a dispersant consisting of modified low Na methylmethacrylate under a liquid form comprising about 40 wt % of active content is added to water at an amount of 0.5 wt % with respect to the raw batch of a mixture.
- the raw batch mixture is added progressively to the solution with above dispersant and water. Initial PH at about 7.0 is progressively adjusted to 9.1 by adding a dispersant consisting of 2-amino-2 methyl propanol (instead of sodium hydroxide) during raw batch mixture addition.

COMPARATIVE EXAMPLES 1 and 2

The same proceeding was followed but in comparative example 1 and in comparative example 2 but the milling time was respectively increased by 50% and decreased by 30%. The resulting final powder mixture has then an average particle size of 0.5 micrometer for comparative example 1 and 2 micrometers for comparative example 1.

COMPARATIVE EXAMPLE 3

The same proceeding as example 1 according to the invention was followed but the resin was added with water after co-milling and was water soluble. The water soluble Resolic phenolic resin is Bakelite® PF0435 FW01 supplied by Hexion.

COMPARATIVE EXAMPLE 4

The same proceeding as example 2 according to the invention was followed but the water insoluble resin was added after co-milling and has an average grain size of about 20 micrometers.

COMPARATIVE EXAMPLE 5

The same proceeding as example 1 according to the invention was followed but the water insoluble resin was totally replaced by a Carbon black powder at a level of 2% to achieve the same level of carbon addition.

Raw materials, essential technical processing parameters and characterization results are shown in the table 1 and 2 below.

Examples 1 and 2 according to the present invention compared to the comparative examples 1, 2, 3 and 4 show that appropriate selection of the size of the particles SiC, boron mineral compound and resin lead to the obtaining of a slip with high solid loading and then relative density higher than 95%.

Example 3 of the present invention shows that is possible to use a source of carbon like carbon black in addition to the resin grains, provided that the average particle size remains within the claimed range, while keeping high solid loading and high relative density.

The comparison of invention example 3 with comparative example 5 show that the replacement of all the insoluble resin powder by a carbon black powder leads to an equivalent solid loading but a smaller sintering final density, lower than 95%. However, as shown by example 4 according to the invention, by adjusting the dispersant system with a low molecular weight polymer with low sodium content in the slip casting composition to minimize the steric effect as described above in the description, it remains possible to replace all the insoluble resin powder by carbon black powder to achieve a higher relative density.

TABLEAU 1

|  | Invention example 1 | invention example 2 | Invention example 3 | Invention example 4 |
| --- | --- | --- | --- | --- |
| Process | All compounds co-milled to 1 micron | SiC + boron compound co-milled and further addition of resin | Part of the resin replaced by carbon black | All the resin replaced by carbon black |
| SiC | D50 = 10 micron | D50 = 10 micron | D50 = 10 micron | D50 = 10 micron |
| Boron compound | B4C powder d50 = 3 micron | B4C powder d50 = 3 micron | B4C powder d50 = 3 micron | B4C powder D50 = 3 micron |

-continued

TABLEAU 1

|  | Invention example 1 | invention example 2 | Invention example 3 | Invention example 4 |
|---|---|---|---|---|
| Carbon-containing compound | Novolak PF0235 DP solid powder d50 = 20 micron added before co-milling | Novolak PF7219 suspension 32% solid content d50 = 1.3 microns added after co-milling | Novolak 20 micron 60/40% carbon black particles added before co-milling | Carbon black particles |
| Co milling of the mixture | 3 days | milling time same as invention example 1 | milling time same as invention example 1 | milling time same as invention example 1 |
| Size after co-milling | SiC + B4C + Novolak resin average particle size d50 = 1.0 micron | d50 = 1.0 micron | SiC + B4C + Novolak resin + Carbon Black average particle size d50 = 1.1 micron | SiC + B4C + Carbon Black average particle size d50 = 0.79 micron |
| Drying | | Spray-drying | | |
| Mixing of slip for slip casting | 5% Acrylic suspension + water + 24 hour rolling | 5% Acrylic suspension + water + 24 hour rolling | 5% Acrylic suspension + water + 24 hour rolling | 5% Acrylic suspension + water + dispersants* + 24 hour rolling |
| Solid loading-relative to water | 75 wt % | 75 wt % | 75 wt % | 76 wt % |
| pH/viscosity of slip | | 8.5/ 0.2 Pa·s at 40 s$^{-1}$ | | 9.1/ 0.26 Pa·s 40 s$^{-1}$ |
| shaping | | Slip casting | | |
| Firing shrinkage apparent Density g/cm3 after sintering and relative density | 18% linear 3.14 g/cm$^3$ or 98% of theoretical (3.21)) | 19% linear 3.12 g/cm$^3$ or 97% of Theoretical (3.21) | 18% linear 3.09 g/cm$^3$ or 96% of Theoretical (3.21) | 18% linear 3.12 g/cm$^3$ or 97% of Theoretical (3.21) |

*low Namethylmetacrylate + 2-amino-2 methyl propanol

TABLEAU 2

|  | Comparative example 1 | Comparative example 2 | Comparative example 3 | Comparative example 4 | Comparative example 5 |
|---|---|---|---|---|---|
| Process | Same as example 1 but co-milled to 0.4 micron | Same as example 1 but co-milled to 2.1 microns | Water-soluble resin used instead of Novolak | Coarse resin grains added after co-milling | Co-milled to 1 micron but only with carbon black |
| SiC | $D_{50}$ = 10 μm | $D_{50}$ = 10 μm | $D_{50}$ = 10 μm | $D_{50}$ = 10 μm | $D_{50}$ = 10 μm |
| Boron compound | B4C powder $D_{50}$ = 3 μm | B4C powder $D_{50}$ = 3 μm | B4C powder $D_{50}$ = 3 μm | B4C powder $D_{50}$ = 3 μm | B4C powder $D_{50}$ = 3 μm |
| Carbon-containing compound | Novolak 20 micron added before co-milling | Novolak 20 micron added before co-milling | Water soluble resin added after co-milling | Novolak 20 micron added after co-milling | Only carbon black particles added before co-milling |
| Co milling of the mixture | +50% more duration vs example 1 | −30% duration vs example 1 | milling time same as invention example 1 | milling time same as invention example 1 | milling time same as invention example 1 |
| Size after co-milling | SiC + B4C + Novolak d50 = 0.4 μm | SiC + B4C + Novolak d50 = 2.1 μm | SiC + B4C d50 = 0.9 μm | SiC + B4C d50 = 1.1 μm | SiC + B4C + Carbon Black d50 = 1.0 μm |
| Drying | | | Spray-drying | | |
| Mixing of slip for slip casting | 5% Acrylic suspension + water + 24 hour rolling | 5% Acrylic suspension + water + 24 hour rolling | 5% water soluble resin + 5% Acrylics + water + 24 hour rolling | 5% Acrylic suspension + water + 24 hour rolling | 5% Acrylic suspension + water + 24 hour rolling |

-continued

TABLEAU 2

| | Comparative example 1 | Comparative example 2 | Comparative example 3 | Comparative example 4 | Comparative example 5 |
|---|---|---|---|---|---|
| Solid loading-relative to water | 64 wt % | 78 wt % | 61.3 wt % | 75 wt % | 75 wt % |
| pH/viscosity of slip shaping | | | 8.5/ 0.2 Pa · s at 40 s$^{-1}$ Slip casting | | |
| Firing shrinkage | 22% linear | 12% linear | 20% linear | 18% linear | 17% linear |
| apparent Density g/cm3 after sintering density | 3.04 g/cm3 below 95% of Theoretical (3.21) | 2.90 g/cm3 or 90% of Theoretical (3.21) | 2.90 g/cm3 or 90% of Theoretical (3.21) | 2.96 g/cm3 or 92% of Theoretical (3.21) | 3.03 g/cm3 or 94% of Theoretical (3.21) |

The invention claimed is:

1. A co-milled SiC based sinterable powder comprising, by dried weight of said powder:
    a) a mineral content comprising
       silicon carbide (SiC) particles,
       mineral boron compound particles,
       the powder comprising at least 50% by weight of SiC and the total mineral content of the powder being at least 90% by weight,
    b) at least a water insoluble carbon-containing source, the powder comprising at least 1% by weight, of said water insoluble carbon-containing source, wherein the silicon carbide particles, the mineral boron compound particles, and the carbon-containing source are co-milled such that the average particle size of said co-milled SiC based sinterable powder is between 0.7 to 1.5 micrometers.

2. The SiC based sinterable powder according to claim 1, wherein said water insoluble carbon-containing source is a water insoluble carbon-containing resin.

3. The sinterable powder according to claim 1, wherein the insoluble resin is chosen among the group of resins which melt at a temperature higher than 80° C.

4. The sinterable powder according to claim 1, wherein the resin exhibits a carbon content which is higher than 30% by weight.

5. The sinterable powder according to claim 1, wherein the insoluble resin is chosen from among the group of phenolic resins.

6. The sinterable powder according to claim 2, comprising an additional elemental carbon source, so that carbon free content is between 1% and 10% by weight based upon SiC content.

7. The sinterable powder according to claim 1, wherein said water insoluble carbon-containing source consists essentially of at least one of amorphous carbon, crystallized carbon, and graphite oxide.

8. The sinterable powder according to claim 1, wherein the mineral boron compound is boron carbide B$_4$C.

9. The sinterable powder according to claim 1, comprising an acrylic polymer suspension, in a proportion less than 8% by weight of the co-milled powder of SiC grains and mineral compound of boron.

10. The sinterable powder according to claim 1, wherein the powder comprises at least 60% by weight of SiC.

11. The sinterable powder according to claim 1, wherein the total mineral content of the powder is at least 95% by weight.

12. The sinterable powder according to claim 1, wherein the powder comprises at least 2% and less than 8%, by weight, of said water insoluble carbon-containing source.

13. The sinterable powder according to claim 1, wherein the powder comprises between 0.5 and 5.0% by weight of the boron compound.

14. A slurry comprising the SiC-based powder according to claim 1 and water.

15. A manufacturing method of a sinterable SiC-based powder according to claim 1, comprising at least the following steps:
    co-milling an aqueous mixture of a mineral powders of SiC and of mineral compound of boron,
    before or during the co-milling, adding a water insoluble carbon containing source, so that the average particle size of the resulting mixture is comprised between 0.7 to 1.5 micrometers.

16. The manufacturing method according to claim 15, wherein after co-milling, the content of the mixture SiC and mineral Boron compound, is higher than 80% of dried weight the sinterable SiC based powder.

17. The manufacturing method according to claim 15, wherein the co-milling of SiC and mineral boron is operated with the carbon containing source, until the d50 value of the resulting powder including the particles of carbon containing source, is between 0.5 and 2 micrometers.

18. The manufacturing method of a SiC pressureless sintered body comprising the following steps:
    preparation of an aqueous slurry according to claim 14, the solid loading of which being higher than 65% by weight,
    slip casting to obtain a shaped body
    drying of the shaped body
    optionally curing step under air at a temperature higher than 100° C. and below 300° C.
    pressureless sintering of the above body, under a sintering temperature of between 2000 and 2400° C.

19. The manufacturing method according to claim 15, further comprising, after the co-milling, drying the resulting mixture to obtain a co-milled powder having less than 1% moisture by weight.

20. A silicon carbide based sintered product obtainable by the pressureless sintering of a slip casted body manufactured by the method of claim 18, characterized in that the relative density of the sintered product is higher than 95%.

* * * * *